（12）United States Patent
Ueno et al.

(10) Patent No.: US 11,054,911 B2
(45) Date of Patent: Jul. 6, 2021

(54) ELECTRONIC DEVICE, PROGRAM, AND CONTROL METHOD

(71) Applicant: KYOCERA Corporation, Kyoto (JP)

(72) Inventors: Yasuhiro Ueno, Yokohama (JP); Shigeki Tanabe, Yokohama (JP); Hideki Morita, Yokohama (JP); Isao Masuike, Machida (JP); Koutaro Yamauchi, Yokohama (JP); Manabu Sakuma, Yokohama (JP); Kenji Shimada, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/606,162

(22) PCT Filed: Apr. 6, 2018

(86) PCT No.: PCT/JP2018/014730
§ 371 (c)(1),
(2) Date: Oct. 17, 2019

(87) PCT Pub. No.: WO2018/193877
PCT Pub. Date: Oct. 25, 2018

(65) Prior Publication Data
US 2020/0125178 A1    Apr. 23, 2020

(30) Foreign Application Priority Data

Apr. 18, 2017   (JP) .............................. JP2017-082326

(51) Int. Cl.
*G06F 3/01*    (2006.01)
*G06F 3/042*   (2006.01)

(52) U.S. Cl.
CPC ............ *G06F 3/017* (2013.01); *G06F 3/0425* (2013.01); *G06F 2203/04101* (2013.01)

(58) Field of Classification Search
CPC ....... G06F 3/017; G06F 3/0425; G06F 3/0346
(Continued)

(56) References Cited

U.S. PATENT DOCUMENTS 8,988,532 B2 *   3/2015   Soffer .................... G03B 17/18
                                                  348/207.1
9,223,415 B1 *  12/2015   Zhou .................. G06K 9/00335
(Continued)

FOREIGN PATENT DOCUMENTS

EP        2256591 A1    12/2010
JP      2010-277198 A   12/2010
(Continued)

OTHER PUBLICATIONS

"Ultimate Comfort Smartphone Settings"; TJ Mook; Jul. 27, 2014; pp. 1-4; ISBN 978-4-8002-2681-5; Takarajimasha; Japan.

*Primary Examiner* — Calvin C Ma
(74) *Attorney, Agent, or Firm* — Studebaker & Brackett PC

(57) ABSTRACT

An electronic device 1 includes a proximity sensor 18, a camera 13, and a controller 11 configured to switch between gesture detection based on a value output from the proximity sensor 18 and gesture detection based on a value output from the camera 13, in accordance with a state in which a user uses the electronic device. The controller 11 may determine the state of the electronic device based on an environment of the electronic device being used by the user. The controller 11 may determine the state of the electronic device based on a state of the electronic device. The controller 11 may determine the state of the electronic device based on a distance between the user and the electronic device. The controller 11 may determine the state of the electronic device based on a user operation.

11 Claims, 13 Drawing Sheets

(58) Field of Classification Search
USPC .................... 345/156, 157, 173, 175; 348/77
See application file for complete search history.

(56) References Cited

U.S. PATENT DOCUMENTS

| | | | |
|---|---|---|---|
| 9,389,690 | B2 | 7/2016 | Li et al. |
| 9,832,452 | B1* | 11/2017 | Fotland .................... G01S 3/00 |
| 10,037,083 | B2 | 7/2018 | Nii |
| 10,346,027 | B2 | 7/2019 | Miyazaki |
| 10,591,974 | B2* | 3/2020 | da Veiga ............... G06F 1/3231 |
| 2010/0300771 | A1 | 12/2010 | Miyazaki |
| 2013/0194238 | A1* | 8/2013 | Sakai ............... H04N 21/42204 |
| | | | 345/175 |
| 2013/0229508 | A1* | 9/2013 | Li ........................ G06F 1/3287 |
| | | | 348/77 |
| 2014/0004901 | A1* | 1/2014 | Korn ................ H04M 1/72522 |
| | | | 455/556.1 |
| 2015/0346831 | A1 | 12/2015 | Nii |
| 2016/0054858 | A1* | 2/2016 | Cronholm ............... G06F 3/005 |
| | | | 345/175 |
| 2019/0033976 | A1* | 1/2019 | Cao .................... H04N 5/23229 |
| 2019/0050664 | A1* | 2/2019 | Yang ...................... G06F 3/012 |

FOREIGN PATENT DOCUMENTS

| | | |
|---|---|---|
| JP | 2013-145455 A | 7/2013 |
| JP | 2015-509634 A | 3/2015 |
| JP | 2015-225493 A | 12/2015 |
| JP | 2016-057779 A | 4/2016 |
| WO | 2014/168558 A1 | 10/2014 |

* cited by examiner

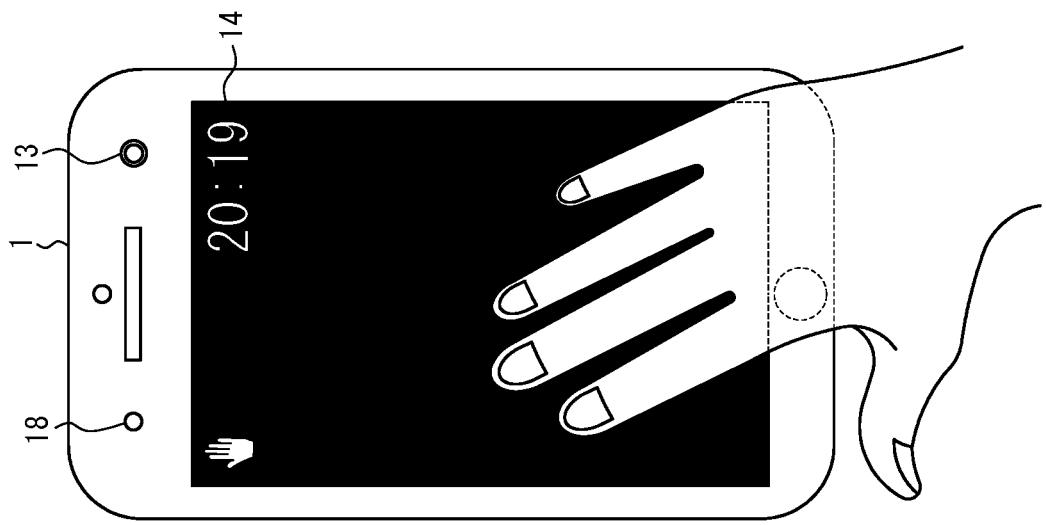
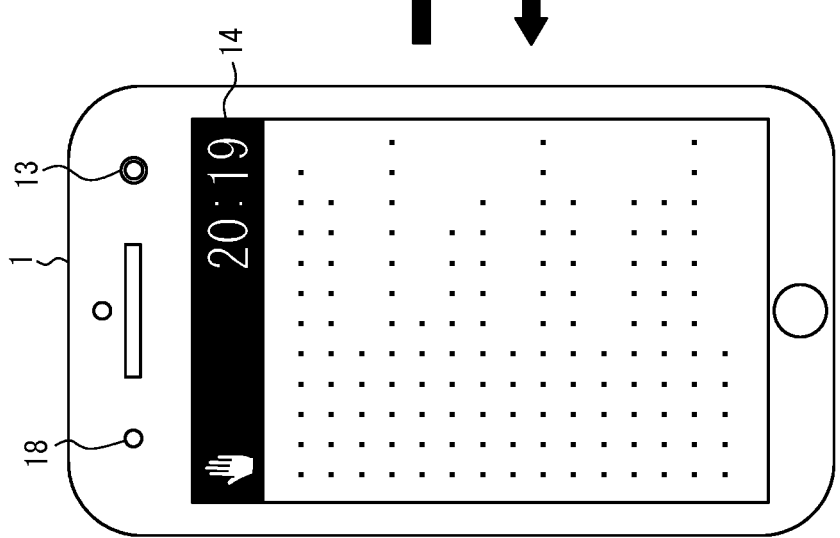

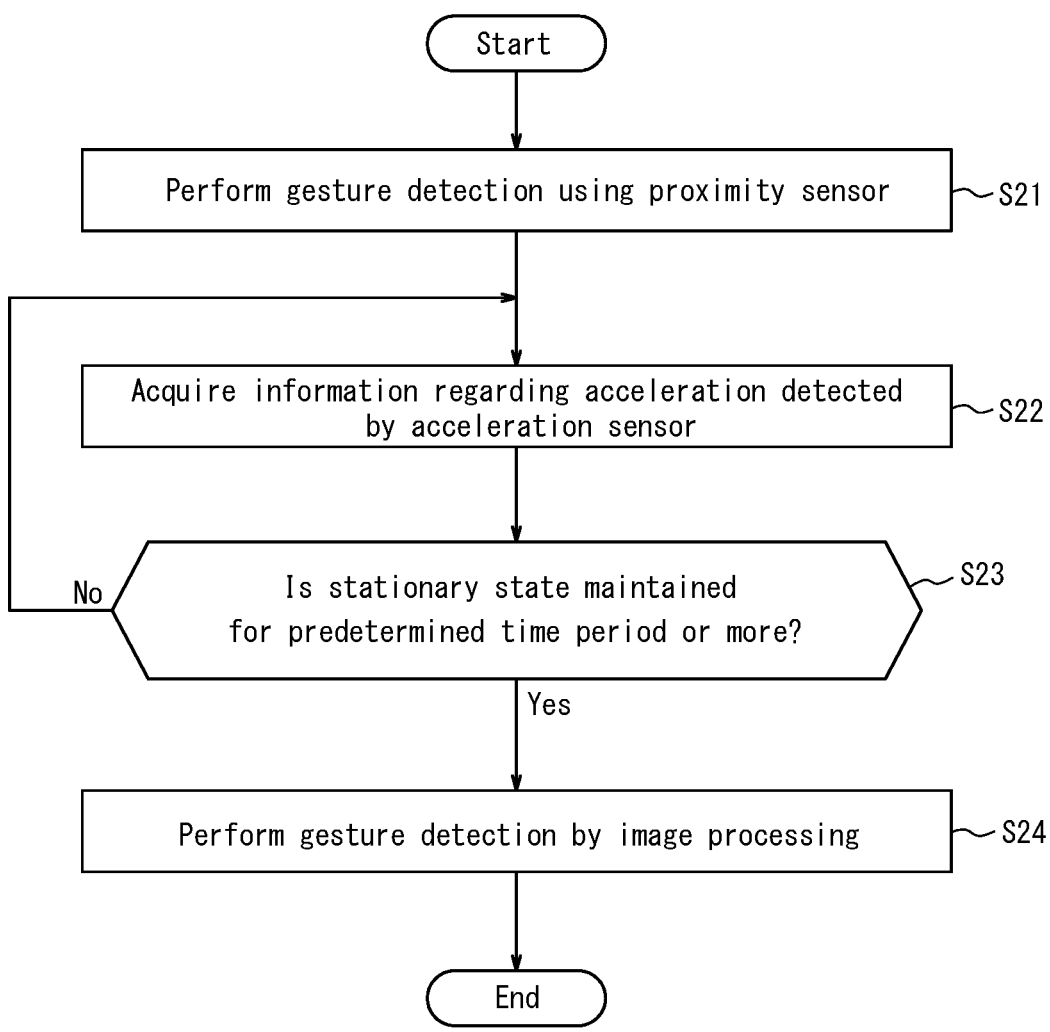

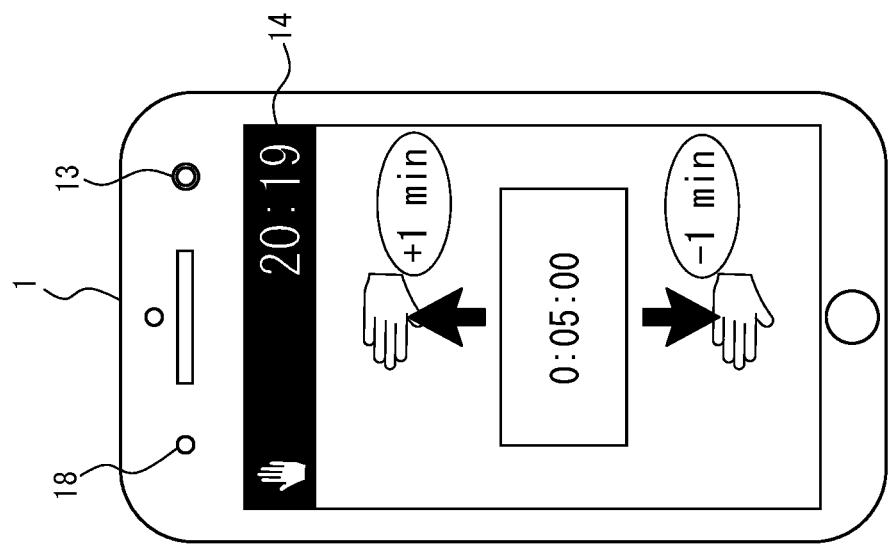
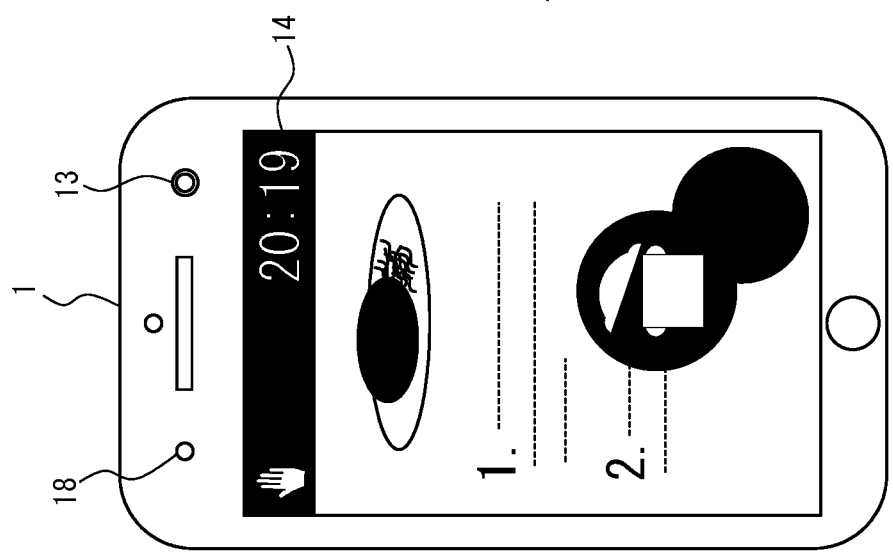

ELECTRONIC DEVICE, PROGRAM, AND CONTROL METHOD

CROSS REFERENCE TO RELATED APPLICATION

This application claims priority to and the benefit of Japanese Patent Application No. 2017-082326 (filed on Apr. 18, 2017), the entire contents of which are incorporated herein by reference.

TECHNICAL FIELD

The present disclosure relates to an electronic device, a program, and a control method.

BACKGROUND

For example, electronic devices such as smartphones and tablet PCs are generally provided with a touch panel. Typically, users control the electronic devices by touching the touch panels. Recently, electronic devices that detect gestures performed by users positioned remote from the electronic devices using a proximity sensor such as an infrared sensor and perform input operations corresponding to the gestures are known.

CITATION LIST

Patent Literature

PTL 1: JP-A-2015-225493

SUMMARY

Technical Problem

According to the technology described in PTL 1, gesture detection is performed using only a proximity sensor. When a proximity sensor is used to detect a gesture, a user performs gestures at positions relatively close to an electronic device (e.g., several centimeters away).

Here, the technology (hereinafter, referred to as "gesture detection by image processing") to detect a gesture by extracting a predetermined part (e.g a hand) of a user from an image captured by a visible light camera (hereinafter, referred to simply as "camera") is widely known. Gesture detection by image processing can detect a user gesture even when the user is located remote (e.g., several meters away) from the electronic device. That is, gesture detection by image processing enables the user to operate the electronic device from a remote location, as compared to gesture detection using a proximity sensor.

However, in gesture detection by image processing, a video image captured by the camera is necessary. Thus, gesture detection by image processing consumes more power than gesture detection using a proximity sensor. Electronic devices such as, for example, smartphones and tablet PCs have limited battery capacities. Accordingly, performing gesture detection by image processing alone rather than the gesture detection using a proximity sensor is not practical from the viewpoint of, for example, power consumption.

In view of the above background, an object of the present disclosure is to provide an electronic device, a program, and a control method that are capable of suppressing an increase in power consumption while also improving user operability associated with a gesture.

Solution to Problem

An electronic device according to an embodiment of the present disclosure includes a proximity sensor, a camera, and a controller configured to switch between gesture detection based on a value output from the proximity sensor and gesture detection based on a value output from the camera, in accordance with a state in which a user uses the electronic device.

A program according to an embodiment of the present disclosure causes an electronic device including a proximity sensor and a camera to switch between gesture detection based on a value output from the proximity sensor and gesture detection based on a value output from the camera, in accordance with a state in which a user uses the electronic device.

A control method according to an embodiment of the present disclosure is a control method of an electronic device that includes a proximity sensor and a camera. The control method switches between gesture detection based on a value output from the proximity sensor and gesture detection based on a value output from the camera, in accordance with a state in which a user uses the electronic device.

Advantageous Effect

Embodiments of the present disclosure provide an electronic device, a program, and a control method that are capable of suppressing an increase in power consumption while also improving user operability associated with a gesture.

BRIEF DESCRIPTION OF THE DRAWINGS

In the accompanying drawings:

FIG. 9A is a diagram illustrating a screen in an active state, and FIG. 9B is a diagram illustrating an example of a screen in a sleep state;

FIG. 11 is a flowchart illustrating an example switching operation for the gesture detection methods based on a distance between a user and the electronic device;

FIG. 12A is a diagram illustrating a screen displaying a recipe, and FIG. 12B is a diagram illustrating an example of a timer setting screen.

DETAILED DESCRIPTION

Configuration of Electronic Device

Figure 1:
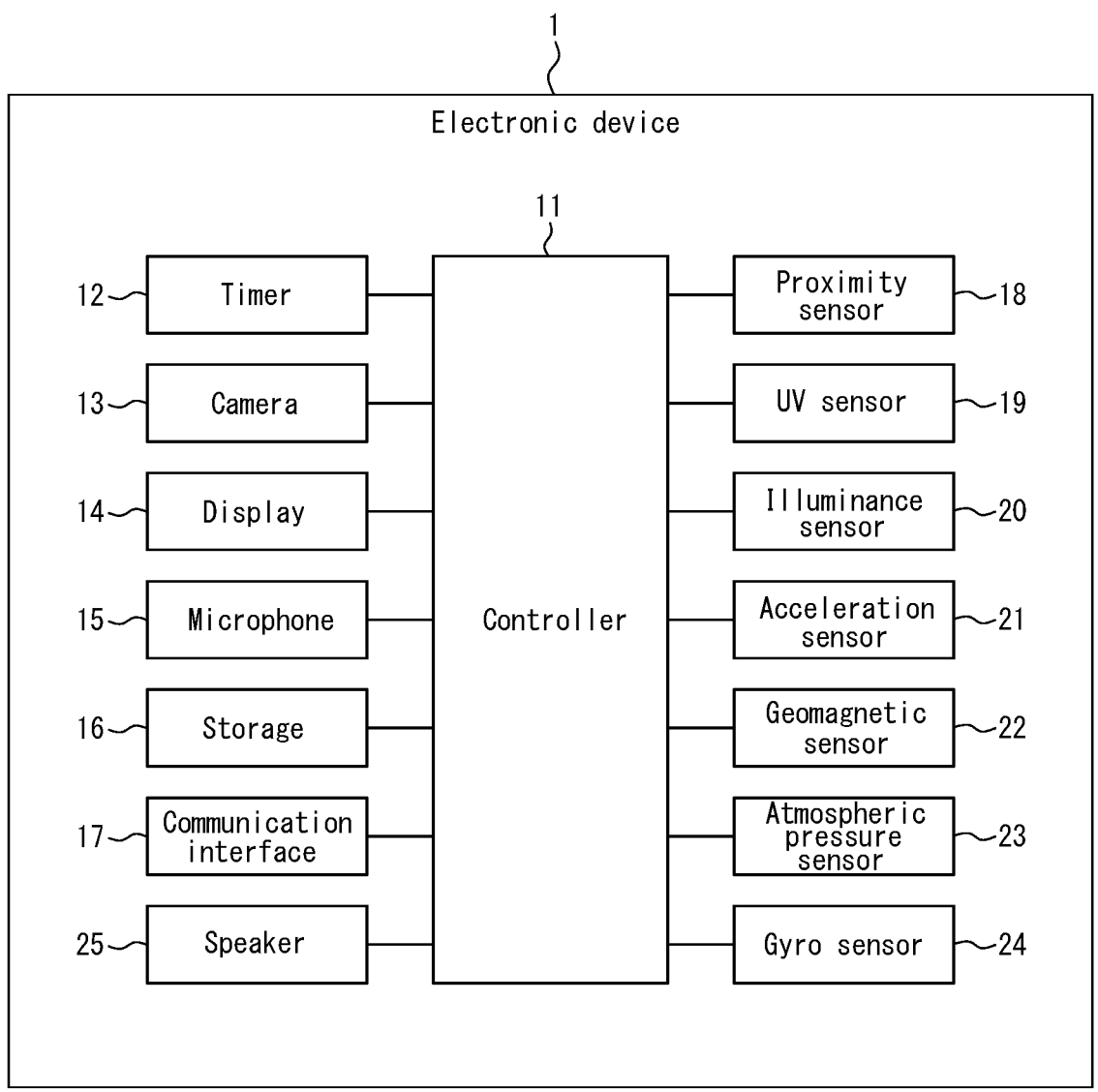
FIG. 1 is a diagram illustrating a schematic configuration of an electronic device according to an embodiment of the present disclosure.

An electronic device 1 according to an embodiment includes a proximity sensor 18 (a gesture sensor) and a controller 11 as illustrated in FIG. 1. The electronic device 1 also includes a timer 12, a camera 13, a display 14, a microphone 15, a storage 16, a communication interface 17, and a speaker 25. In the present embodiment, the electronic device 1 further includes a UV sensor 19, an illuminance sensor 20, an acceleration sensor 21, a geomagnetic sensor 22, an atmospheric pressure sensor 23, and a gyro sensor 24. FIG. 1 illustrates an example. The electronic device 1 does not need to include all of the constituent elements illustrated in FIG. 1. Also, the electronic device 1 may include constituent elements other than those illustrated in FIG. 1.

When a predetermined period of time has elapsed after receiving a timer operating instruction from the controller 11, the timer 12 outputs a signal to that effect to the controller 11. The timer 12 may be provided independently of the controller 11 as illustrated in FIG. 1 or built in the controller 11.

The camera 13 captures an image of an object located in the vicinity of the electronic device 1. The camera 13 is, for example, a front-facing camera 13a provided on a surface of the electronic device 1 having the display 14 provided thereto. Alternatively, the camera 13 is, for example, a rear-facing camera provided on a rear surface of the electronic device 1 (a surface on an opposite side from the surface having the display 14 provided thereto). In the present embodiment, the camera 13 includes the front-facing camera and the rear-facing camera.

The display 14 displays a screen. The screen includes at least one of, for example, characters, images, symbols, and graphics. The display 14 may be an LCD (Liquid Crystal Display). The display 14 may be an organic EL (Electroluminescence) panel or an inorganic EL panel. In the present embodiment, the display 14 is a touchpanel display (a touchscreen display). The touchpanel display detects a contact made by a finger or a stylus pen and locates a contact position. The display 14 can simultaneously detect a plurality of positions which are contacted by fingers or stylus pens.

The microphone 15 detects a sound around the electronic device 1 including a human voice.

The storage 16 serves as a memory and stores programs and data. The storage 16 provisionally stores an operation result of the controller 11. The storage 16 may include any storage device such as a semiconductor storage device or a magnetic storage device. The storage 16 may include a plurality of types of storage devices. The storage 16 may include a combination of a portable storage medium such as a memory card and a storage medium reader.

The programs stored in the storage 16 include an application for running in a foreground or a background and a control program for assisting the running of the application. For example, the application causes the controller 11 to perform an operation corresponding to a gesture. The control program is, for example, an OS (Operating System). The application and the control program may be installed in the storage 16 via communication performed by the communication interface 17 or the storage medium.

The communication interface 17 is an interface that enables wired or wireless communication. A communication method used by the communication interface 17 according to an embodiment conforms to a wireless communication standard. For example, wireless communication standards include communication standards for cellular phones such as 2G, 3G, and 4G Communication standards for cellular phones include, for example, LTE (Long Term Evolution) and W-CDMA (Wideband Code Division Multiple Access). Communication standards for cellular phones also include, for example, CDMA2000 and PDC (Personal Digital Cellular). Communication standards for cellular phones further include, for example, GSM® (Global System for Mobile communications; GMS is a registered trademark in Japan, other countries, or both) and PHS (Personal Handy-phone System). For example, wireless communication standards include WiMAX (Worldwide Interoperability for Microwave Access), IEEE 802.11, and Bluetooth® (Bluetooth is a registered trademark in Japan, other countries, or both). Wireless communication standards include, for example, IrDA (Infrared Data Association) or NFC (Near Field Communication). The communication interface 17 may support one or more communication standards mentioned above.

The speaker 25 outputs sound. For example, during a telephone call, the other party's voice is output from the speaker. For example, when news or weather forecast is read aloud, the contents are output as a sound from the speaker 25.

The proximity sensor 18 detects a relative distance between an object in the vicinity of the electronic device 1 and the electronic device 1 together with a moving direction of the object, in a non-contact manner. In the present embodiment, the proximity sensor 18 includes one light source infrared LED (Light Emitting Diode) and four infrared photodiodes. The proximity sensor 18 causes the light source infrared LED to irradiate the object. The proximity sensor 18 receives reflected light from the object as incident light at the infrared photodiodes. Then, the proximity sensor 18 can measure a relative distance to the object based on an output current of the infrared photodiodes. The proximity sensor 18 also detects a moving direction of the object based on temporal differences between the reflected light from the object incident on the infrared photodiodes. Thus, the proximity sensor 18 can detect an operation using an air gesture (hereinafter, referred to simply as "gesture") performed by a user of the electronic device 1 without touching the electronic device 1. Here, the proximity sensor 18 may include a visible light photodiode.

The controller 11 is configured as, for example, a processor such as a CPU (Central Processing Unit). The controller 11 may be configured as an integrated circuit such as a SoC (System-on-a-Chip) that includes integrated components. The controller 11 may be configured as a combination of a plurality of integrated circuits. The controller 11 realizes various functions by integrally controlling the operation of the electronic device 1.

In particular, the controller 11 refers to the data stored in the storage 16 as necessary. The controller 11 realizes various functions by executing instructions included in the programs stored in the storage 16 and controlling other functional units including the display 14. For example, the controller 11 acquires data regarding a contact made by a user. For example, the controller 11 acquires information regarding a gesture performed by a user detected by the proximity sensor 18. For example, the controller 11 acquires information regarding the remaining time in a countdown (a timer time) from the timer 12. Also, for example, the controller 11 recognizes a running status of an application.

For example, the controller 11 recognizes ambient light of the electronic device 1 based on information regarding the illuminance detected by the illuminance sensor 20. For example, the controller 11 recognizes an orientation of the electronic device 1 and whether the electronic device 1 is in a stationary state, based on information regarding the acceleration detected by the acceleration sensor 21. When the controller 11 determines that the electronic device 1 is in the stationary state, the controller 11 may count a stationary period itself or using the timer 12. The controller 11 performs an operation to extract a predetermined part (e.g., a hand) of the user from an image that is captured by the camera 13 and stored in the storage 16. The controller 11 detects and determines a gesture based on a temporal change of the predetermined part of the user extracted from the image.

The UV sensor 19 can measure the level of ultraviolet light contained in sunlight.

The illuminance sensor 20 detects the illuminance of ambient light incident on the illuminance sensor 20. The illuminance sensor 20 may be configured as, for example, a photodiode or a photo-transistor.

The acceleration sensor 21 detects a direction and magnitude of an acceleration applied to the electronic device 1. A value output from the acceleration sensor 21 is information regarding a detected acceleration. The acceleration sensor 21 is of, for example, a three-axis (a three-dimensional) type configured to detect acceleration in an x-axis direction, a y-axis direction, and a z-axis direction. The acceleration sensor 21 may be of, for example, a piezoresistive type or a capacitance type.

The geomagnetic sensor 22 detects a direction of geomagnetism and allows measurement of the orientation of the electronic device 1.

The atmospheric pressure sensor 23 detects air pressure (atmospheric pressure) external to the electronic device 1.

The gyro sensor 24 detects an angular velocity of the electronic device 1. The controller 11 can measure a change in the orientation of the electronic device 1 by performing time integration of the angular velocity acquired by the gyro sensor 24.

Gesture Operation of the Electronic Device

Figure 2:
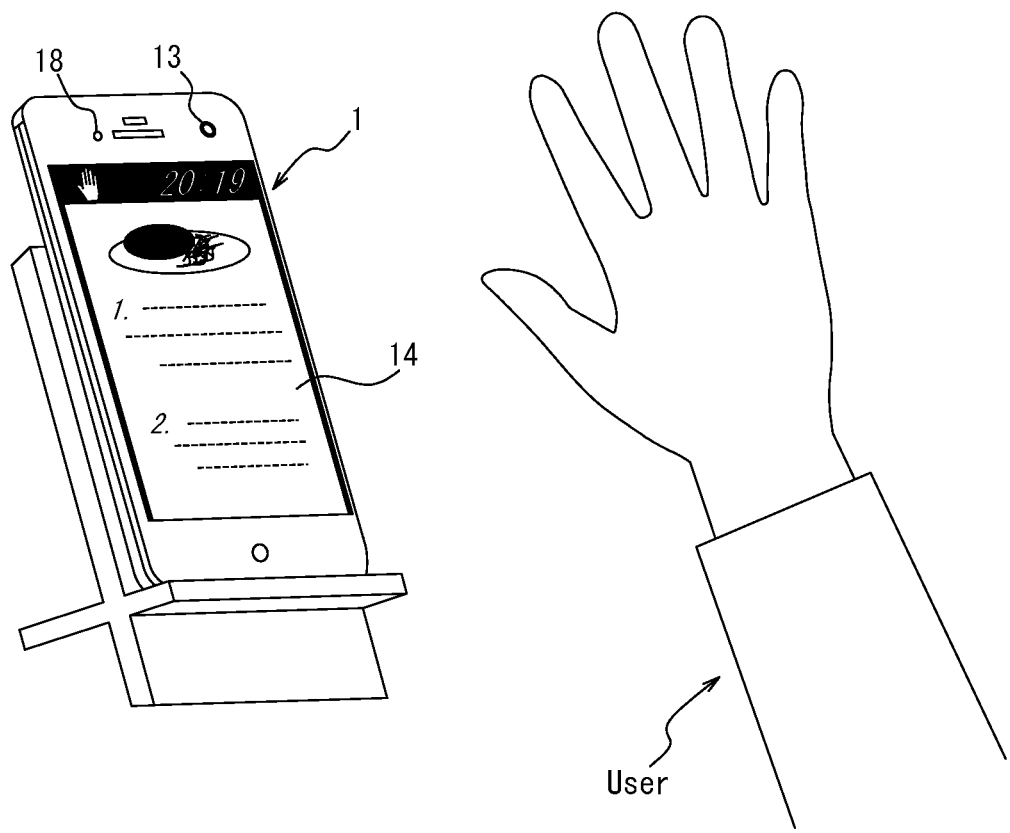
FIG. 2 is a diagram illustrating a state in which a user operates the electronic device by performing a gesture.

FIG. 2 illustrates a state in which a user operates the electronic device 1 by performing a gesture. In FIG. 2, the electronic device 1 is supported by a stand, by way of example. Alternatively, the electronic device 1 may lean against a wall or be placed on a table. When the proximity sensor 18 detects a user gesture, the controller 11 performs an operation corresponding to the detected gesture. In the example illustrated in FIG. 2, the operation corresponding to the gesture is scrolling of the screen displaying a recipe. For example, when the user performs a gesture moving the hand upward in the longitudinal direction of the electronic device 1, the screen is scrolled upward in conjunction with the motion of the user's hand. When the user performs a gesture moving the hand downward in the longitudinal direction of the electronic device 1, the screen is scrolled downward in conjunction with the motion of the user's hand. Here, the controller 11 may detect a gesture based on images captured by the camera 13, in place of the gesture detection using the proximity sensor 18.

The electronic device 1 illustrated in FIG. 2 is a smartphone. Alternately, the electronic device 1 may be, for example, a mobile phone, a phablet, a tablet PC, or a feature phone. The electronic device 1 is not limited to the above devices and may be, for example, a PDA, a remote controller, a portable music player, a gaming machine, an electronic book reader, a car navigation system, home appliances, or industrial equipment (FA equipment).

Proximity Sensor Gesture Detection Method

Figure 3:
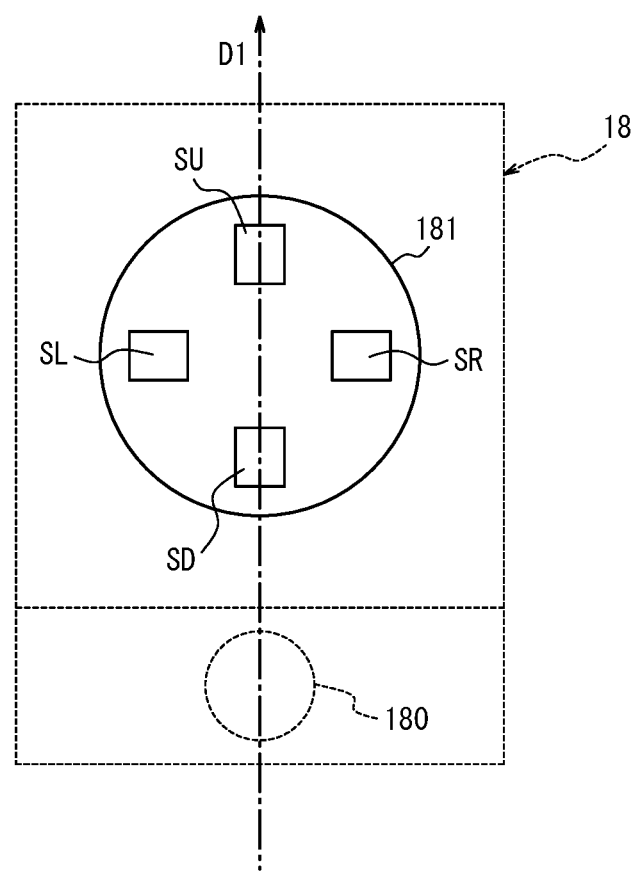
FIG. 3 is a diagram illustrating a schematic configuration of a proximity sensor.

Here, a method employed by the controller 11 for detecting a user's gesture based on an output of the proximity sensor 18 will be described with reference to FIG. 3 and FIG. 4. FIG. 3 is a diagram illustrating an example configuration of the proximity sensor 18 when the electronic device 1 is viewed from the front side. The proximity sensor 18 includes a light source infrared LED 180 and four infrared photodiodes SU, SR, SD, and SL. The four infrared photodiodes SU, SR, SD, and SL detect reflected light from a detection object via a lens 181. The four infrared photodiodes SU, SR, SD, and SL are symmetrically arranged when viewed from the center of the lens 181. Here, the virtual line D1 illustrated in FIG. 3 is approximately parallel to the longitudinal direction of the electronic device 1. On the virtual line D1 of FIG. 3, the infrared photodiode SU and the infrared photodiode SD are arranged spaced apart from each other. Also, the infrared photodiode SR and the infrared photodiode SL are arranged between the infrared photodiode SU and infrared photodiode SD in the direction of the virtual line D1 of FIG. 3.

Figure 4:
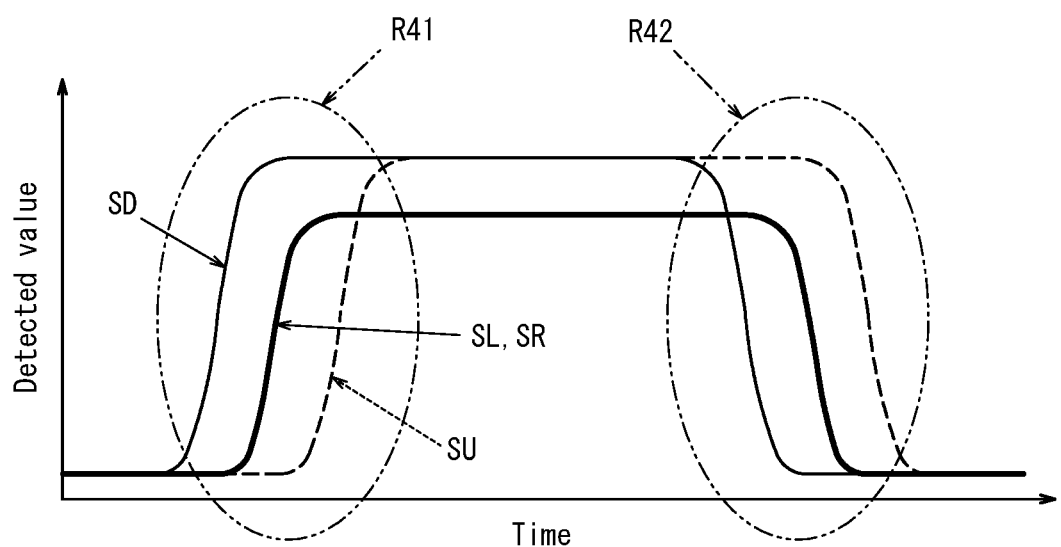
FIG. 4 is a graph illustrating a transition of values detected by each infrared photo diode.

FIG. 4 illustrates an example transition of a detected value of the four infrared photodiodes SU, SR, SD, and SL when the detection object (e.g., a user's hand) moves along the direction of the virtual line D1 of FIG. 3. Here, the infrared photodiode SU and the infrared photodiode SD have the longest distance therebetween in the direction of the virtual line D1. Thus, a temporal difference between a change (e.g., an increase) in the value (i.e., the broken line) detected by the infrared photodiode SU and the same change (e.g., the increase) in the value (i.e., the narrow solid line) detected by the infrared photodiode SD becomes the largest. The controller 11 can determine a moving direction of the detection object by recognizing the temporal difference between a given change in the values detected by the photodiodes SU, SR, SD, and SL.

The controller 11 acquires the values detected by the photodiodes SU, SR, SD, and SL from the proximity sensor 18. Then, in order to recognize motion of the detection object in the direction of the virtual line D1, the controller 11 may perform time integration of a value acquired by subtracting the value detected by the photodiode SU from the value detected by the photodiode SD over a predetermined time period. In the example of FIG. 4, the integral value in the regions R41 and R42 is a value other than zero. From the change in the integrated value (e.g. a positive, zero, or negative change), the controller 11 can recognize the motion of the detection object in the direction of the virtual line D1.

Further, the controller 11 may perform time integration of a value acquired by subtracting the value detected by the photodiode SR from the value detected by the photodiode SL over a predetermined time period. From the change in the integrated value (e.g. a positive, zero, or negative change), the controller 11 can recognize a motion of the detection object in a direction orthogonal to the virtual line D1 (i.e., a direction approximately parallel to the transverse direction of the electronic device 1).

Alternatively, the controller 11 may perform the calculation using all of the values detected by the photodiodes SU, SR, SD, and SL. That is, the controller 11 may recognize the moving direction of the detection object without separating components of the longitudinal direction of the electronic device 1 and components of the transverse direction from each other for the calculation.

The gestures detected by the proximity sensor 18 include, for example, a left-right direction gesture, an up-down direction gesture, an oblique gesture, a gesture which draws a circle in a clockwise direction, and a gesture which draws a circle in a counter-clockwise direction. For example, the left-right direction gesture is a gesture performed in the direction approximately parallel to the transverse direction of the electronic device 1. The up-down direction gesture is a gesture performed in the direction approximately parallel to the longitudinal direction of the electronic device 1. The oblique gesture is a gesture performed in a direction that is not parallel to the longitudinal direction or the transverse direction of the electronic device 1 in a plane approximately parallel to the electronic device 1.

Kitchen Mode

Figure 5:
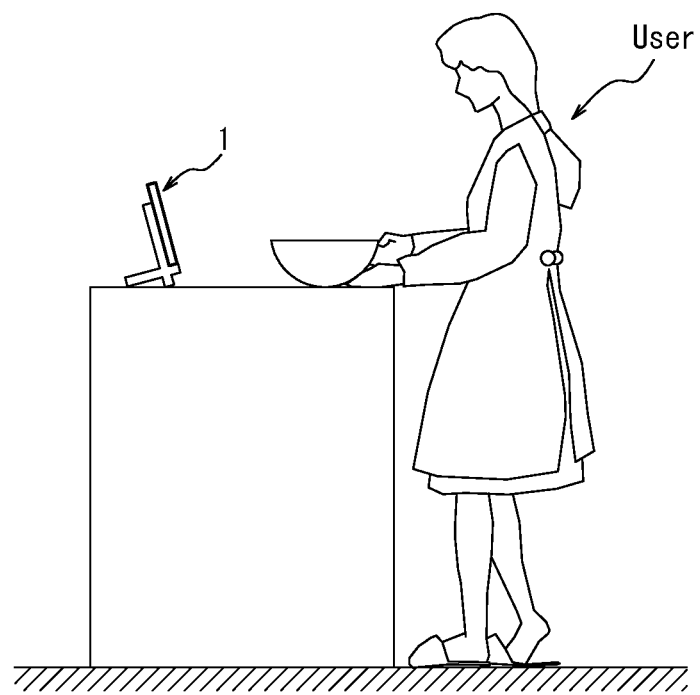
FIG. 5 is a diagram illustrating an example state in which the electronic device is operated by a gesture.

FIG. 5 illustrates an example state in which the user operates the electronic device 1 by performing a gesture. In the example of FIG. 5, the user is cooking while displaying a recipe on the display 14 of the electronic device 1 in a kitchen. In the example of FIG. 5, the proximity sensor 18 detects the users gesture. Then, the controller 11 performs an operation corresponding to the gesture detected by the proximity sensor 18. For example, the controller 11 can perform an operation to scroll the recipe in accordance with a particular gesture (e.g., motion of the user's hand in the up-down direction). During cooking, the users hand may get messy or wet. However, the user can scroll the recipe without touching the electronic device 1. Thus, the user can avoid smudging the display 14 or contaminating the users hand with germs or the like on the display 14.

Here, the electronic device 1 has a plurality of modes. The modes refer to operation modes (operating states or operating conditions) that limit the overall operations of the electronic device 1. Only one of the modes can be selected at a time. In the present embodiment, the modes of the electronic device 1 include at least a first mode and a second mode. The first mode is a normal operation mode (a normal mode) suitable for use in rooms other than a kitchen and outside. The second mode is an operation mode (a kitchen mode) of the electronic device 1 suitably used when a user is cooking viewing a recipe in the kitchen. As described above, the second mode enables input operations made by gestures.

In the second mode (the kitchen mode), the electronic device 1 detects a gesture using the proximity sensor 18. Here, for example, when the user is separated from the electronic device 1 supported by the stand by more than a detection distance (e.g., several centimeters) of the proximity sensor 18, the user cannot perform an input operation by a gesture. The electronic device 1 according to the present embodiment can extract a predetermined part (e.g., a hand) of the user from images captured by the camera 13, and detect and determine a gesture based on a temporal change of the predetermined user's part. That is, the electronic device 1 can perform gesture detection using image processing. In this case, when the predetermined part of the user is included in the image, the electronic device 1 can detect a gesture even when the user is, for example, at a location remote from the electronic device 1 by several meters. Gesture detection by image processing can detect complicated gestures in addition to, for example, a left-right direction gesture. Thus, gesture detection by image processing can further improve the user operability associated with a gesture.

However, according to gesture detection by image processing, a video image captured by the camera 13 is required. Thus, the power consumption of gesture detection by image processing is greater than that of gesture detection using the proximity sensor 18. Further, because the predetermined part of the user needs to be extracted from an image captured by the camera 13, gesture detection by image processing requires the brightness in the vicinity of the electronic device 1 to be within an appropriate range. Accordingly, performing gesture detection by image processing in place instead of gesture detection using the proximity sensor 18 is not practical from the viewpoint of power consumption, for example.

As such, the electronic device 1 according to the present embodiment switches between gesture detection based on a value output from the proximity sensor 18 and gesture detection based on a value output from the camera 13, depending on the state in which the device (the electronic device 1) is used by the user. Here, in the gesture detection by image processing, the electronic device 1 extracts, for example, an outline in an image and determines whether geometric characteristics of the outline corresponds to the predetermined part of the user. Then, the electronic device 1 extracts a part that has been determined to be the predetermined part of the user and detects a gesture by acquiring a temporal change of the extracted part. Here, the gesture detection by image processing is not limited to the above process and can employ any appropriate known technique.

Switching of Gesture Detection Methods

The controller 11 of the electronic device 1 according to the present embodiment determines a state in which the device is being used by the user based on the environment in which the device is being used by the user. The environment of the device is, for example, the ambient brightness. For example, when the electronic device 1 is operated in a kitchen in the second mode (the kitchen mode), strong sunlight from the sun in the west may enter from afternoon to evening. In this case, there is a risk that gesture detection by image processing which uses an image acquired from the camera 13 cannot accurately extract the user due to the effect of the backlight, and a gesture recognition rate deteriorates.

Figure 6:
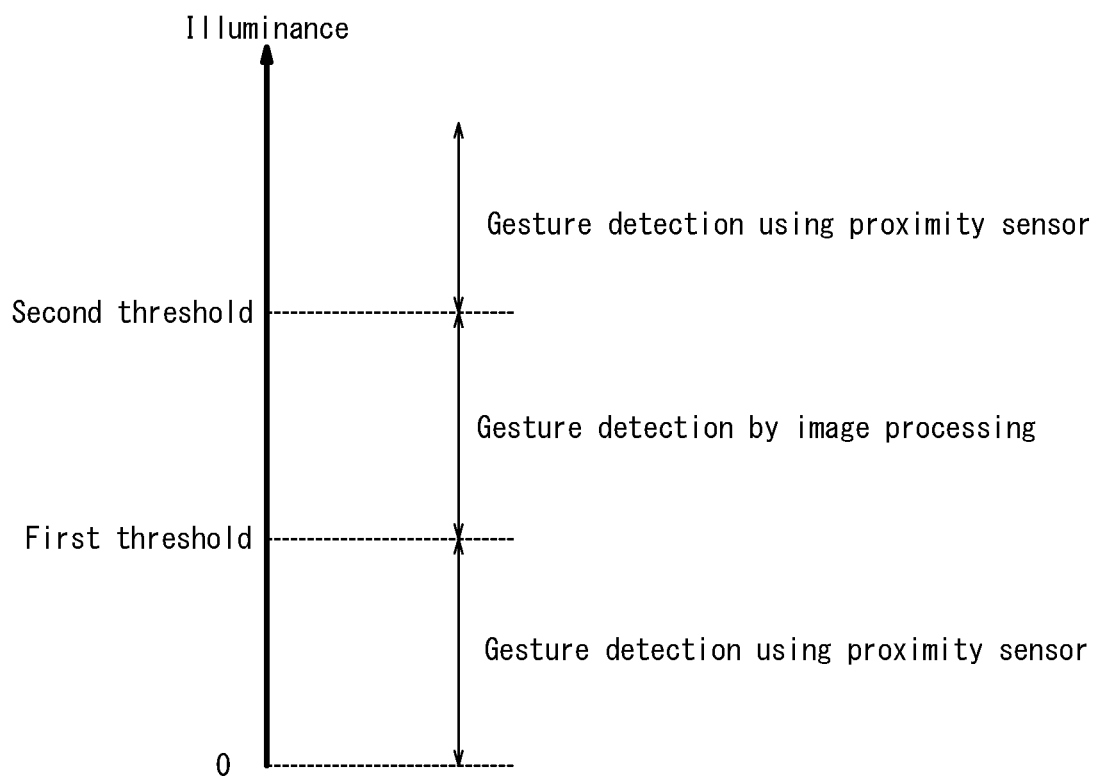
FIG. 6 is a diagram illustrating a relationship between the illuminance of ambient light and the switching between gesture detection methods.

FIG. 6 is a diagram illustrating a relationship between the illuminance of the ambient light and the switchover of the gesture detection methods according to the present embodiment. When the electronic device 1 operates in the second mode (the kitchen mode), the controller 11 of the electronic device 1 recognizes ambient light of the electronic device 1 based on information regarding the illuminance detected by the illuminance sensor 20. When the illuminance of the ambient light is equal to or more than a first threshold and less than a second threshold, the controller 11 performs gesture detection based on a value output from the camera 13 (i.e., gesture detection by image processing). When the illuminance of the ambient light is equal to or more than the second threshold, the controller 11 performs gesture detection based on a value output from the proximity sensor 18 (i.e., gesture detection using the proximity sensor 18). When the illuminance of ambient light is less than the first threshold, the controller 11 performs gesture detection based on a value output from the proximity sensor 18.

Here, in the present embodiment, the first threshold is, for example, 300 lux. The illuminance at sunrise or sunset is, for example, approximately 300 lux. In the present embodiment, the second threshold is, for example, 2000 lux. For example, the illuminance in cloudy weather approximately 1 hour after sunrise is approximately 2000 lux. When the illuminance of ambient light is equal to or more than the first threshold and less than the second threshold, the electronic device 1 can appropriately extract the predetermined user's part from an image captured by the camera 13 and thus performs gesture detection by image processing. For example, the illuminance in a kitchen illuminated by a fluorescent light is approximately 1000 lux. In this case, the electronic device 1 according to the present embodiment performs gesture detection by image processing.

Figure 7:
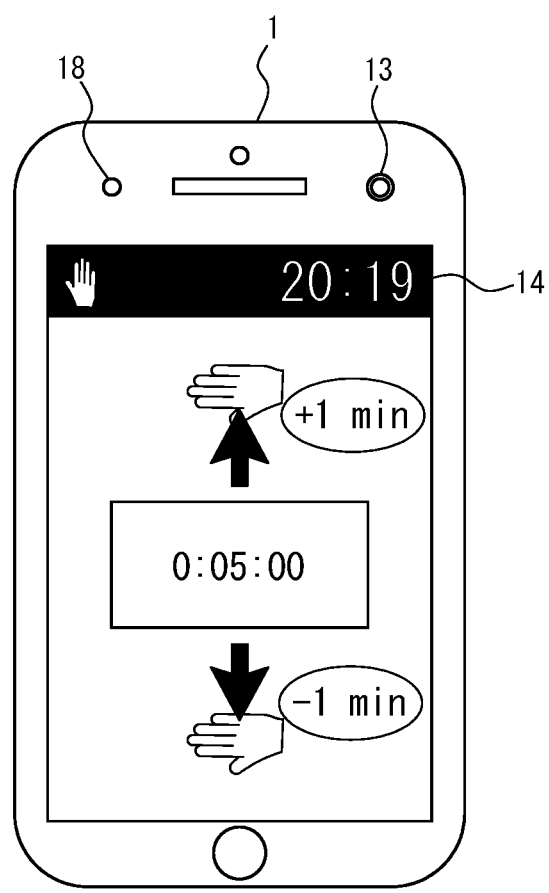
FIG. 7 is a diagram illustrating an example timer screen of the electronic device according to an embodiment.

FIG. 7 illustrates a state in which the display 14 of the electronic device 1 operating in the second mode (the kitchen mode) displays a setting screen for the timer 12. The timer setting is set to 5 minutes by default. When the controller 11 performs gesture detection using the proximity sensor 18, the controller 11 adjusts the timer setting based on gestures in which the hand of the user moves in an up-down direction. For example, when the proximity sensor 18 detects a gesture in which the hand moves in an upward motion, the controller 11 adds 1 minute to the timer setting. For example, when the proximity sensor 18 detects a gesture in which the hand moves in a downward motion, the controller 11 subtracts 1 minutes from the timer setting.

The controller 11 can also make adjustments according to gestures in which the hand of the user moves in an up-down direction when performing gesture detection by image processing. In addition, when performing gesture detection by image processing, the controller 11 can change the timer setting based on the number of fingers indicated by the user. For example, the controller 11 reads an image captured by the camera 13 and stored in the storage 16 and extracts the user's hand. For example, when an extracted user's hand is raising three fingers, the controller 11 changes the timer setting to 3 minutes. As illustrated by this example, gesture detection by image processing can detect complex gestures made by the user. Thus, gesture detection by image processing enables additional input operations which utilize complex gestures to be made (the input operation made by the gesture in which fingers are raised in the above example). Thus, the user operability associated with a gesture can be improved.

Here, the controller 11 performs gesture detection by image processing only when the illuminance of ambient light is equal to or more than the first threshold and less than the second threshold. That is, when there is a likelihood that the user's hand cannot be appropriately extracted from a captured image, the controller 11 performs gesture detection using the proximity sensor 18. Thus, the electronic device 1 can suppress an increase in the power consumption as compared to a case in which gesture detection by image processing alone is performed.

Flowchart

Figure 8:
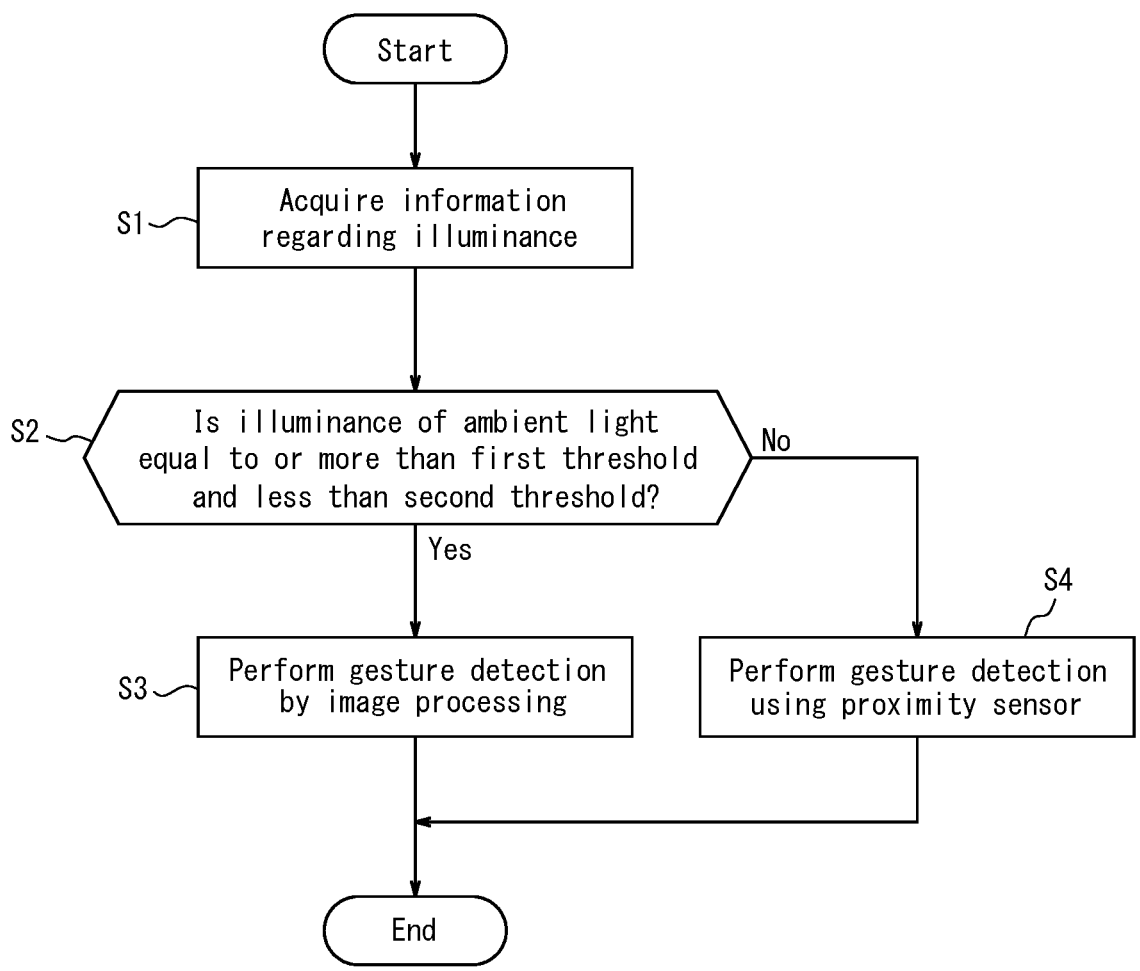
FIG. 8 is a flowchart illustrating an example switching operation for gesture detection methods based on an illuminance of ambient light.

FIG. 8 is a flowchart illustrating an example of a gesture detection method switching operation based on the illuminance of ambient light performed by the electronic device 1. At the start of the operation illustrated in FIG. 8, the electronic device 1 is operating in the second mode (the kitchen mode) which enables an input operation made by a gesture.

The controller 11 of the electronic device 1 acquires information regarding the illuminance detected by the illuminance sensor 20 (step S1). That is, the controller 11 acquires information regarding the illuminance of the ambient light as an example of the environment of the electronic device 1.

The controller 11 determines whether the illuminance of the ambient light is equal to or more than the first threshold and less than the second threshold (step S2). Here, the first threshold is, for example, 300 lux and may be varied based on a minimum subject illuminance or the like of the specification of the camera 13. Also, the second threshold is, for example, 2000 lux and may be varied based on, for example, whether the camera 13 has a backlight correction function. That is, the first threshold and the second threshold are not necessarily fixed values. For example, the first threshold and the second threshold may be varied based on the performance of the camera 13 of the electronic device 1.

When the illuminance of the ambient light is equal to or more than the first threshold and less than the second threshold (Yes in step S2), the controller 11 performs gesture detection by image processing (step S3). When the illuminance of the ambient light is not within the range equal to or more than the first threshold and less than the second threshold (No in step S2), the controller 11 performs gesture detection using the proximity sensor 18 (step S4). That is, the controller 11 switches between the gesture detection methods based on the illuminance of the ambient light.

As described above, the electronic device 1 according to the present embodiment includes the proximity sensor 18 and the camera 13 that enable the gesture detection. The controller 11 determines a state in which the device (i.e., the electronic device 1) is used by the user based on the environment (the illuminance) of the device being used by the user. That is, the controller 11 determines whether the electronic device 1 is used in darkness or an environment with strong sunlight, for example. Then, the controller 11 switches between gesture detection based on a value output from the proximity sensor 18 and gesture detection based on a value output from the camera 13 in accordance with the state in which the device is used by the user. By performing the above switching operation, the electronic device 1 according to the present embodiment can suppress an increase in power consumption while also improve user operability associated with a gesture.

Here, in association with the switching operation based on the illuminance of ambient light, the electronic device 1 may a function as described below. That is, in a dark environment when there is a power outage or when the light is turned off at nighttime, the controller 11 may autonomously cause the electronic device 1 to operate in a third mode (a low illuminance mode) based on the information regarding the illuminance detected by the illuminance sensor 20. For example, when the illuminance of ambient light is less than the first threshold, the controller 11 may cause the electronic device 1 to operate in the third mode. When the electronic device 1 operates in the third mode, gesture detection using the proximity sensor 18 is enabled. The proximity sensor 18 uses infrared light and thus can detect a user gesture in a dark environment. The electronic device 1 may turn on the display 14 upon detecting a user gesture in which a hand is held over the electronic device 1. The display 14 may be turned on for a short time (e.g., 2 seconds). In another embodiment, the display 14 may be kept on until the user touches the display 14. In still another embodiment, the display 14 may repeat flashing for a predetermined time period (e.g., 5 seconds). When the electronic device 1 has one of the above functions, in a case in which the user is in a dark place and does not know the exact location of the electronic device 1, the user can find the electronic device 1 by virtue of the display 14 being turned on, by simply holding a hand in an approximate location.

Alternatively, the user can make a selection to cause the electronic device 1 to operate in the third mode (the low luminance mode). For example, the electronic device 1 may operate in the third mode only when the user specifically sets to operate in the third mode via a setting screen. The electronic device 1 may include an application program for causing the illuminance sensor 20 to detect an illuminance (hereinafter, referred to as "illuminance detection app"). In this case, the electronic device 1 may determine whether to operate in the third mode based on a value of the illuminance at the time of activation of the illuminance detection app by the user. For example, when the illuminance is less than 1000 lux at the time of activation of the illuminance detection app, operation in the third mode may be selected.

The electronic device 1 according to another embodiment will be described with reference to FIG. 9 and FIG. 10. The configuration of the electronic device 1 according to the present embodiment is the same as that of the electronic device 1 in the above embodiment. The electronic device 1 according to the present embodiment switches between gesture detection based on a value output from the proximity sensor 18 and gesture detection based on a value output from the camera 13, in the manner described below.

Sleep Screen

FIG. 9A illustrates a state in which a recipe is displayed on the display 14 of the electronic device 1 while operating in the second mode (as an example of an active state). FIG. 9B illustrates a state in which the electronic device 1 is in a sleep state and the display 14 is turned off. When a predetermined time period (e.g., 1 minute) has elapsed without a user input operation in the state of FIG. 9A, the electronic device 1 enters into the sleep state and the display 14 is turned off as illustrated in FIG. 9B. An input operation made by a gesture to the electronic device 1 operating in the second mode is effective even when in the sleep state. Thus, when the user holds a hand over the electronic device 1 in the state of FIG. 9B, the sleep state of the electronic device 1 is canceled and the display shown in FIG. 9A is restored.

Switching of Gesture Detection Methods

The controller 11 of the electronic device 1 according to the present embodiment determines the usage state of the electronic device 1 by the user based on a state of the electronic device 1. In the present embodiment, the state of the electronic device 1 means an active state or a sleep state. When the electronic device 1 is in the active state, the controller 11 operates the camera 13 and performs gesture detection by image processing. When the gesture detection by the image processing is performed as described above, the user operability associated with a gesture is improved.

Here, if the controller 11 causes the camera 13 to capture a video image and determines a gesture in the sleep state of the electronic device 1, power consumption is increased. As such, the controller 11 performs gesture detection based on a value output from the proximity sensor 18 in the sleep state. According to the present embodiment, when the predetermined time period has elapsed without a user input operation, the electronic device 1 enters the sleep state and switches to gesture detection using the proximity sensor 18. Thus, the electronic device 1 can suppress an increase in power consumption.

However, when the electronic device 1 is being charged, there is no need to reduce power consumption. Thus, the controller 11 may continue performing the gesture detection by image processing.

Flowchart

Figure 10:
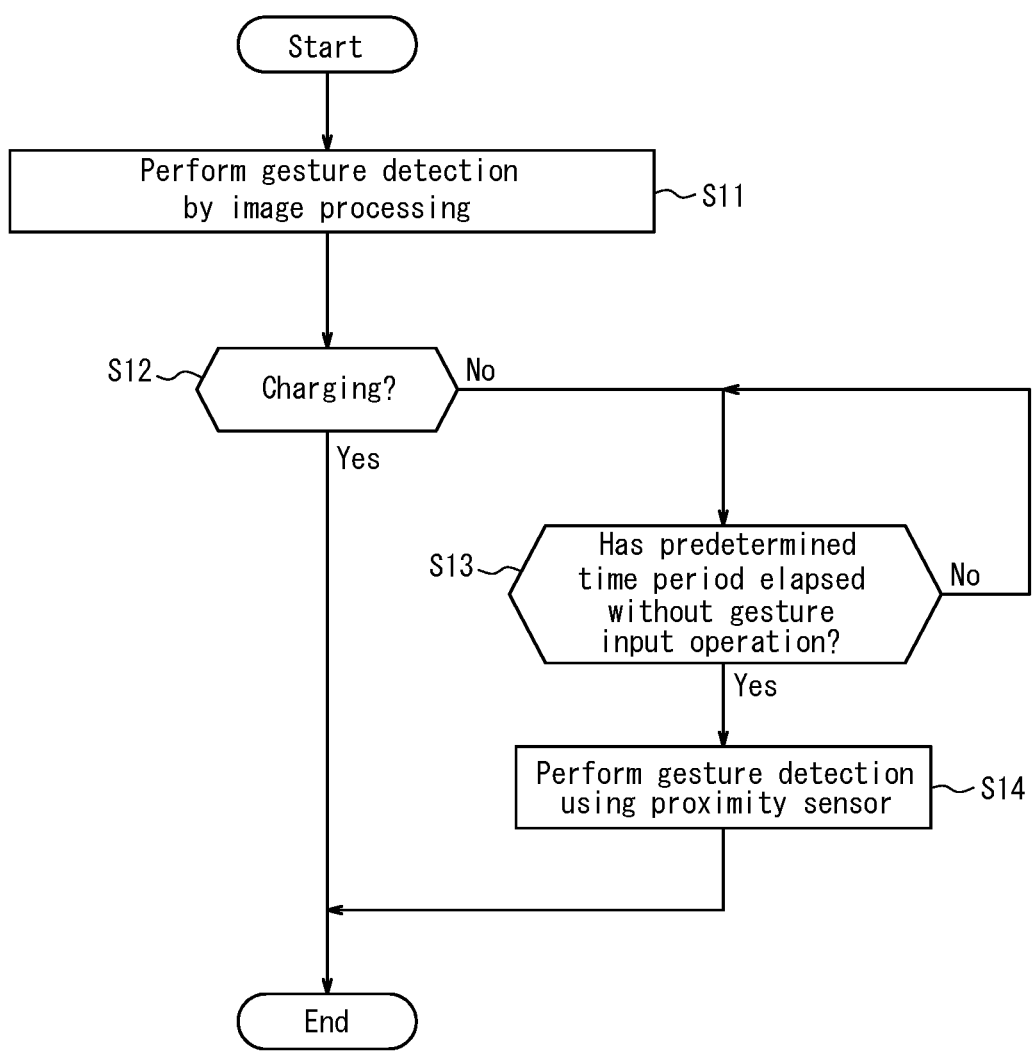
FIG. 10 a flowchart illustrating an example switching operation for the gesture detection methods based on a state of the electronic device.

FIG. 10 is a flowchart illustrating an example of a gesture detection switching operation based on the state of the electronic device 1 performed by the electronic device 1. At the start of the operation illustrated in FIG. 10, the electronic device 1 is operating in the second mode (the kitchen mode) which enables an input operation made by a gesture. Further, at the start of the operation illustrated in FIG. 10, the electronic device 1 is in a state in which the sleep state has been canceled (a state in which the screen display has returned to normal).

The controller 11 of the electronic device 1 performs gesture detection by image processing (step S11). By performing gesture detection by image processing, user operability is improved.

The controller 11 determines whether the electronic device 1 is being charged (step S12). Here, the controller 11 may determine whether the electronic device 1 is being charged by, for example, receiving information regarding a remaining battery capacity of the electronic device 1 and recognizing a temporal change thereof.

When the electronic device 1 is being charged (Yes in step S12), the controller 11 maintains the gesture detection by image processing. That is, the controller 11 ends the sequence of operations to switch between the gesture detection methods. Here, according to the present embodiment, the electronic device 1 being charged does not enter the sleep state and stays in the active state.

When the electronic device 1 is not being charged (No in step S12), the controller 11 proceeds to step S13.

The controller 11 waits for the predetermined time period (e.g., 1 minute) to elapse without an input operation made by a user gesture (No in step S13).

When the predetermined time period (e.g., 1 minute) has elapsed without an input operation made by a user gesture, the electronic device 1 enters the sleep state and turns off the display 14 as illustrated in FIG. 9B. When the electronic device 1 enters the sleep state after the predetermined time period (Yes in step S13), the controller 11 performs gesture detection using the proximity sensor 18 (step S14). By switching to the gesture detection using the proximity sensor 18, the electronic device 1 can suppress an increase in power consumption during the sleep state.

As described above, the controller 11 of the electronic device 1 according to the present embodiment determines the usage state of the device by the user based on a state of the device (the electronic device 1). That is, the controller 11 switches between gesture detection based on a value output from the proximity sensor 18 and gesture detection based on a value output from the camera 13, in accordance with whether the electronic device 1 is in the active state or the sleep state. According to the present embodiment, also, the controller 11 selects the gesture detection method based on whether the electronic device 1 is being charged. By selecting the gesture detection methods as described above, the electronic device 1 according to the present embodiment can suppress an increase in power consumption while also improve user operability associated with a gesture.

Here, in relation to the switchover based on the state of the device itself, the electronic device 1 may have a function as described below. In a case in which the electronic device 1 is in the active state, after another predetermined time period (e.g., 30 seconds) has elapsed without an input operation made by a user gesture, the controller 11 may switch to gesture detection using the proximity sensor 18. In this case, power consumption of the electronic device 1 can be further suppressed. However, when the electronic device 1 is being charged, there is no need to save power consumption. Thus, the controller 11 may maintain the gesture detection by image processing.

An electronic device 1 according to still another embodiment will be described with reference to FIG. 11. The electronic device 1 according to the present embodiment has the same configuration as those of the above embodiments. The electronic device 1 according to the present embodiment switches between gesture detection based on a value output from the proximity sensor 18 and gesture detection based on a value output from the camera 13 in a manner described below.

When the camera 13 continuously captures a video image, a current of, for example, approximately 200 mA flows, thereby causing high power consumption. The power consumption of the proximity sensor 18 is low by virtue of being capable of intermittently operating a light source infrared LED 180 and four photodiodes SU, SR, SD, and SL. However, the detection distance of the proximity sensor 18 is short (e.g., a several centimeters). Thus, the electronic device 1 according to the present embodiment switches between gesture detection methods based on a distance between the user and the device.

Flowchart

FIG. 11 is a flowchart illustrating an example of a gesture detection switching operation based on a distance between the user and the device (the electronic device 1). At the start of the operation illustrated in FIG. 11, the electronic device 1 is operating in the second mode (the kitchen mode) which enables an input operation made by a gesture.

The controller 11 of the electronic device 1 according to the present embodiment performs gesture detection using the proximity sensor 18 (step S21).

The controller 11 acquires information regarding an acceleration detected by the acceleration sensor 21 (step S22). When there is no user input operation to the electronic device 1 and, according to acquired information regarding the acceleration, the electronic device 1 has not been moved, the controller 11 determines that the electronic device 1 is in the stationary state. When the electronic device 1 maintains the stationary state for less than a predetermined time period (e.g., 1 minute) (No in step S23), the controller 11 determines that the user is located near the electronic device 1. When the user is located near the electronic device 1, it can be assumed that the user frequently operates the electronic device 1 and the electronic device 1 is in the stationary state only for a short time. Thus, the controller 11 makes a determination in the manner described above. Then, the controller 11 returns to step S22.

In a case in which the electronic device 1 maintains the stationary state for the predetermined time period (e.g., 1 minute) or more (Yes in step S23), the controller 11 determines that the electronic device 1 and the user are located remote from each other. At this time, the controller 11 activates the camera 13 and performs gesture detection by image processing (step S24) that can recognize an input operation made by a gesture performed by the user located remote from the electronic device 1. As described above, the controller 11 determines the distance (in particular, whether the user is located near or remote from the electronic device 1) based on the output signal from the acceleration sensor 21.

As described above, the controller 11 of the electronic device 1 according to the present embodiment determines the usage state of the device (the electronic device 1) by the user based on a distance between the user and the device. In the present embodiment, the controller 11 estimates the distance between the user and the device based on a duration of the stationary state of the electronic device 1 according to the information regarding the acceleration acquired from the acceleration sensor 21. By performing the switchover as described above, the electronic device 1 according to the present embodiment can suppress an increase in power consumption while also improve user operability associated with a gesture.

Figure 13:
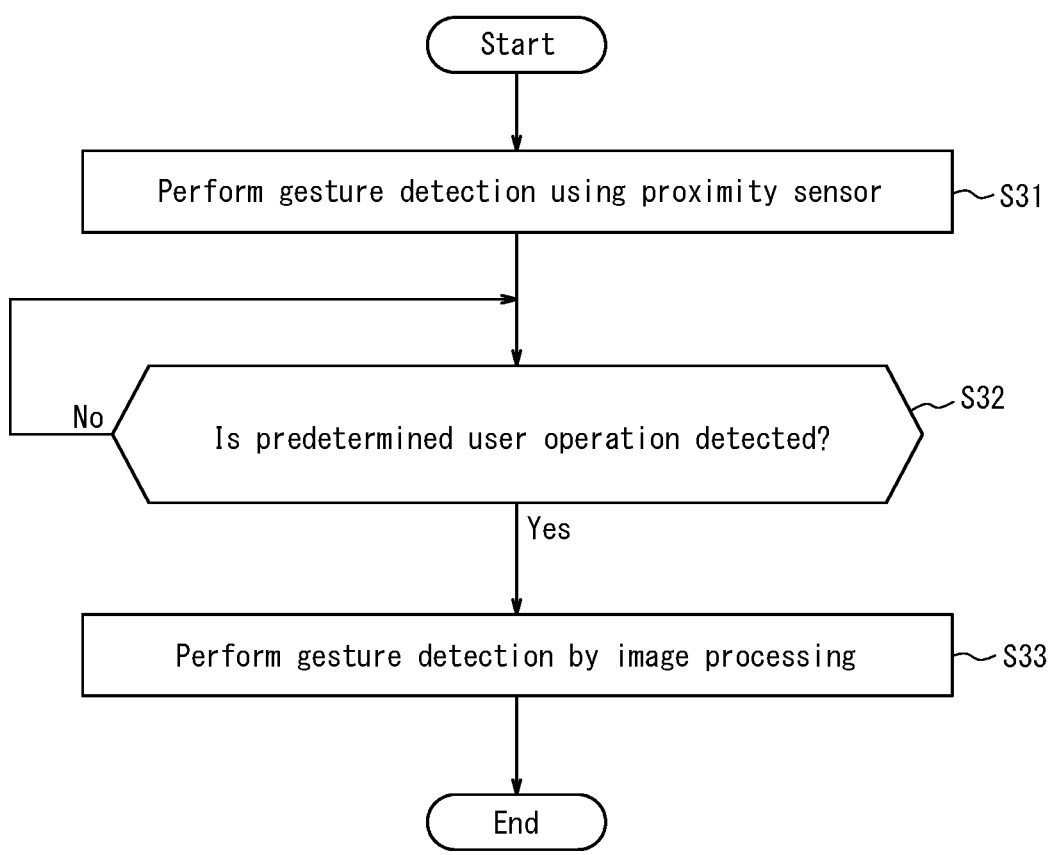
FIG. 13 is a flowchart illustrating an example switching operation for the gesture detection methods based on a user operation.

The electronic device 1 according to still another embodiment will be described with reference to FIG. 12A, FIG. 12B, and FIG. 13. The electronic device 1 according to the present embodiment has the same configuration as that of the electronic device 1 in the above embodiments. The electronic device 1 according to the present embodiment switches between gesture detection based on a value output from the proximity sensor 18 and gesture detection based on a value output from the camera 13 in the manner described below.

FIG. 12A illustrates a state in which a recipe is displayed on the display 14. In this case, the user can scroll the screen of the recipe by performing an input operation made by a gesture without touching the touch panel (the display 14) of the electronic device 1. The controller 11 scrolls the screen of the display 14 based on, for example, a gesture detection signal corresponding to an up-down direction motion of the users hand. Further, in response to, for example, a user gesture in which a hand is held over the display 14 for a predetermined time period (e.g., 1 second), the controller 11 switches between the display of the recipe illustrated in FIG. 12A and the display of the setting screen of the timer 12 as illustrated in FIG. 12B. As described above, when gesture detection by image processing is performed for the setting screen of the timer 12 illustrated in FIG. 12B, the timer setting may be changed based on the number of fingers raised by the user. That is, because gesture detection by image processing is enabled in the setting screen of the timer 12 illustrated in FIG. 12B, the user operability associated with a gesture is improved.

Switching of Gesture Detection Methods

The controller 11 of the electronic device 1 according to the present embodiment determines the using state of the device by the user based on a user operation. The user operation is, for example, an operation to change a display screen. In the example of the present embodiment, the user operation is an operation to change to the timer screen illustrated in FIG. 12B from the recipe screen illustrated in FIG. 12A. When the recipe is displayed on the display 14, the controller 11 performs gesture detection using the proximity sensor 18. In response to the user operation to display the timer screen on the display 14, the controller 11 performs gesture detection by image processing.

Flowchart

The controller 11 of the electronic device 1 according to the present embodiment performs the gesture detection using the proximity sensor 18 (step S31).

The controller 11 waits for detection of a predetermined user operation (No in step S32). While waiting, the controller 11 maintains the gesture detection using the proximity sensor 18. Here, in the example of FIG. 12A and FIG. 12B, the predetermined user operation is a gesture tin which a hand is held over the display 14 to change to the timer screen from the recipe screen.

Upon detecting the predetermined user operation (Yes in step S32), the controller 11 activates the camera 13 and performs gesture detection by image processing (step S33).

As described above, the controller 11 of the electronic device 1 according to the present embodiment determines the usage state of the device by the user based on a user operation. In the example illustrated in FIG. 12A and FIG. 12B, the user can perform an additional input operation by performing a complex gesture (i.e., a gesture to raise a finger or fingers). When the user shifts the electronic device 1 to a state in which an additional input operation made by a gesture using the camera 13 as described above is possible, the controller 11 may switch to gesture detection by image processing from gesture detection using the proximity sensor 18. On the other hand, when the user shifts the electronic device 1 to a state in which there is no additional input operation made by a gesture, the controller 11 may perform gesture detection using the proximity sensor 18. By performing the switchover as described above, the electronic device 1 according to the present embodiment can suppress an increase in power consumption while also improve user operability associated with a gesture.

Other Embodiments

Although the present disclosure has been described based on figures and the embodiments, it should be appreciated that those who are skilled in the art may easily vary or alter in a multiple manner based on the present disclosure. Accordingly, such variation and alteration are to be included in the scope of the present disclosure. For example, a function included in each means or step may be rearranged avoiding a logical inconsistency, such that a plurality of means or steps are combined, or one means or step is subdivided.

In the above embodiment, the electronic device 1 is operated in a kitchen that may be exposed to strong sunlight from the sun in the west. Here, the electronic device 1 may be used outdoors as well as indoors. The electronic device 1 may switch between the gesture detection methods based on a determination of whether it is being used indoors or outdoors.

For example, when the electronic device 1 is used outdoors, the specification of some applications may cause the electronic device 1 to perform gesture detection while displaying a video image captured by the camera 13 on the display 14. In this case, the user's device (i.e., the electronic device 1) may display a person other than the user, which is not preferable from the viewpoint of privacy. As such, when the illuminance of ambient light is equal to or more than a third threshold (e.g., 3000 lux), the controller 11 of the electronic device 1 may determine that the electronic device 1 is being used outdoors. When the controller 11 of the electronic device 1 determines that the electronic device 1 is being used outdoors, the controller 11 performs gesture detection based on a value output from the proximity sensor 18. Here, when the controller 11 determines that the electronic device 1 is being used indoors, the controller 11 may perform gesture detection by image processing.

The controller 11 of the electronic device 1 may determine whether the electronic device 1 is being used outdoors, based on information other than the information regarding illuminance detected by the illuminance sensor 20. For example, the controller 11 may determine that the electronic device 1 is being used outdoors, based on GPS information indicating that the electronic device 1 is remote from the user's home. The controller 11 may determine that the electronic device 1 is being used outdoors, based on a change in GPS reception sensitivity (e.g., an increase in the reception sensitivity). The controller 11 may determine that the electronic device 1 is being used outdoors, when an ID of a WiFi® (WiFi is a registered trademark in Japan, other countries, or both) access point to which the communication interface 17 is connected is different from that of a kitchen in the user's house. The controller 11 may determine that the electronic device 1 is being used outdoors, using some or all of the aforementioned determination methods in combination with a change in the illuminance of ambient light.

As described above, the electronic device 1 according to the present embodiment enables an input operation made by a gesture with consideration of other people's privacy when being used outdoors (especially in public places). Also, when the electronic device 1 is used outdoors and performs gesture detection by image processing, there may be a case in which the electronic device 1 recognizes another person's movement as a gesture by mistake. However, the electronic device 1 according to the present embodiment performs gesture detection using the proximity sensor 18 when being used outdoors and thus can more accurately detect a user gesture.

In the present embodiment, when the device (the electronic device 1) is in the active state, gesture detection by image processing is uniformly performed. However, the controller 11 may perform gesture detection by image processing on a condition that a particular application is activated.

For example, when an application that uses a complex gesture is activated, the controller 11 may perform gesture detection by image processing. Generally, gesture detection using the proximity sensor 18 has difficulty in determining a shape of the user's hand. For example, when a rock-paper-scissors application for determining the rock shape, the paper shape, and the scissor shape of the user's hand is activated, the controller 11 performs gesture detection by image processing. Here, the controller 11 may perform gesture detection using the proximity sensor 18 when such an application is not activated. When the rock-paper-scissors application or the like is not activated, performing gesture detection using the proximity sensor 18 can suppress power consumption of the electronic device 1 in the active state.

As described above, the electronic device 1 of the present embodiment switches between the gesture detection methods based on a type of an application being run. Thus, the power consumption of the electronic device 1 in an active state may be reduced. Here, the application being run may be limited to an application running in the foreground or may include an application running in the background.

In the present embodiment, a distance between the user and the device is estimated from the stationary state of the electronic device 1 based on information regarding an acceleration detected by the acceleration sensor 21. Here, the electronic device 1 may include a distance measuring sensor configured to directly measure a distance between the user and the device. The controller 11 may acquire the distance based on an output signal from the distance measuring sensor (in particular, information regarding the distance between the user and the electronic device 1), in place of the information regarding an acceleration from the acceleration sensor 21. The distance measuring sensor is, for example, a stereo camera capable of recording information regarding a distance to a user by simultaneously capturing images of the user from different directions. The controller 11 acquires a stereo image from the stereo camera. The controller 11 can acquire the distance to the user by extracting the user from the stereo image and performing predetermined image processing.

The electronic device 1 according to the present embodiment can acquire an accurate distance between the user and the device. Also, the electronic device 1 can more appropriately switch between the gesture detection methods. For example, the user can stop an alarm of a kitchen timer from a remote location. Thus, the user operability associated with a gesture is further improved.

The above embodiments may be appropriately combined. For example, while preferably performing the switchover between the gesture detection methods based on a distance between the user and the device as described in the above embodiment, the gesture detection methods may be switched based on the luminance of ambient light as described in other embodiments. For example, the electronic device 1 performs gesture detection by image processing when the electronic device 1 determines that the user and the device are located remote from each other (e.g., by a several meters). When the user is located within the detection range of the proximity sensor 18, the electronic device 1 basically performs the gesture detection using the proximity sensor 18. However, when the illuminance of ambient light is equal to or more than the first threshold and less than the second threshold, the electronic device 1 switches to gesture detection by image processing.

Also, switching between the gesture detection methods based on a distance between the user and the device as described in the above embodiment and using a particular application (as an example of a state of the device) may be combined. The particular application is, for example, a camera app for capturing an image of a subject using the camera 13. For example, when the camera app is in use and the front-facing camera is selected, the electronic device 1 determines that the user and the device are located close to each other. In this case, the electronic device 1 performs the gesture detection using the proximity sensor 18. When the electronic device 1 detects a user gesture to move a hand downward, the electronic device 1 captures an image of a subject (the user in this example). When the camera app is in use and the rear-facing camera is selected, the electronic device 1 determines that the user and the device are located remote from each other. In this case, the electronic device 1 performs gesture detection by image processing. Then, when the electronic device 1 detects a subject person's gesture to move a hand downward, the electronic device 1 captures an image of the subject person. Here, when the rear-facing camera is selected, the electronic device 1 may provide a time lag (e.g., 1 second) between the gesture detection and the capturing of an image, so as to avoid capturing a blur image of the subject person.

Many aspects of the disclosure herein may be represented by a series of operations executed by a computer system or other hardware capable of executing a program instruction. The computer system or the other hardware includes, for example, a general-purpose computer, a PC (personal computer), a specialized computer, a workstation, a PCS (Personal Communications System, a personal mobile communication system), a mobile (cellular) phone, a mobile phone having a data processing function, an RFID receiver, a game machine, an electronic notepad, a laptop computer, a GPS (Global Positioning System) receiver, and other programmable data processing apparatuses. Note that in each embodiment the various operations or control methods are executed by a dedicated circuit implemented by a program instruction (software) (e.g., discrete logic gates interconnected to perform a specific function), a logical block, a program module and/or the like executed by at least one processor. The at least one processor for executing the logical block, the program module and/or the like includes, for example, at least one microprocessor, CPU (Central Processing Unit), ASIC (Application Specific Integrated Circuit), DSP (Digital Signal Processor), PLD (Programmable Logic Device), FPGA (Field Programmable Gate Array), a controller, a microcontroller, a microprocessor, an electronic device, and other apparatuses designed to be capable of executing the functions described herein, and/or a combination thereof. The embodiments presented herein are implemented by, for example, hardware, software, firmware, middleware, a microcode, or any combination thereof.

The instruction may be a program code or a code segment for executing a necessary task. The instruction may be stored in a machine-readable non-transitory storage medium or in another medium. The code segment may represent any combination of a procedure, a function, a subprogram, a program, a routine, a subroutine, a module, a software package, a class or an instruction, and a date configuration or a program statement. The code segment transmits/receives information, a data argument, a variable, and storage contents with another code segment or a hardware circuit. Thus, the code segment is connected to the another code segment or the hardware circuit.

The storage 16 used herein may be a computer readable tangible carrier (medium) including a range of a solid-state memory, a magnetic disk, or an optical disk. Such a media stores an appropriate set of computer instructions such as program modules for causing the processor to execute the techniques disclosed herein, or data structures. The computer-readable media includes: electrical connection with one or more wires; a magnetic disk storage; a magnetic cassette; a magnetic tape; another type of magnetic storage device; an optical storage device such as CD (Compact Disk), LD® (Laser Disk, LD is a registered trademark in Japan, other countries, or both), DVD® (Digital Versatile Disc, DVD is a registered trademark in Japan, other countries, or both), a Floppy® disk (Floppy is a registered trademark in Japan, other countries, or both), and a Blu-ray® disc (Blu-ray is a registered trademark in Japan, other countries, or both); a portable computer disk; RAM (Random Access Memory); ROM (Read-Only Memory); EPROM (Erasable Programmable Read-Only Memory; EEPROM (Electrically Erasable Programmable Read-Only Memory); a flash memory; other tangible storage media capable of storing information; and any combination of the above. The memory may be provided inside and/or outside a processor/processing unit. As used herein, the term "memory" refers to any types of a long-term memory, a short-term memory, a volatile memory, a nonvolatile memory, or other memories and is not limited to a particular type of memory, a particular number of memories, or a particular medium to store information.

REFERENCE SIGNS LIST

1 electronic device
11 controller
12 timer
13 camera
14 display
15 microphone
16 storage
17 communication interface
18 proximity sensor
19 UV sensor
20 illuminance sensor
21 acceleration sensor
22 geomagnetic sensor
23 atmospheric pressure sensor
24 gyro sensor
25 speaker
180 light source infrared LED
181 lens
SU, SR, SD, SL photodiode

The invention claimed is:
1. An electronic device comprising:
a proximity sensor;
a camera;

a controller configured to switch between gesture detection based on a value output from the proximity sensor and gesture detection based on a value output from the camera, in accordance with an illuminance of an ambient light of the electronic device;
a display configured to display a setting screen to set a period of time based on the gesture detection by the controller; and
a timer configured to measure the period of time and to output a signal when the period of time has elapsed, wherein
the controller is further configured to adjust the period of time based on the gesture detection;
when the illuminance of the ambient light of the electronic device at a predetermined moment is less than a first threshold, the gesture detection is based only on the value output from the proximity sensor; and
when the illuminance of the ambient light of the electronic device at the predetermined moment is equal to or more than a first threshold, the controller switches the gesture detection from the proximity sensor to the gesture detection from the camera, the gesture detection is based only on the value output from the camera.

2. The electronic device according to claim 1, wherein the controller is configured to determine the state in which the user uses the electronic device based on an environment in which the electronic device is being used by the user.

3. The electronic device according to claim 1, wherein the controller is configured to determine the state in which the user uses the electronic device based on a state of the electronic device itself.

4. The electronic device according to claim 1, wherein the controller is configured to determine the state in which the user uses the electronic device based on a distance between the user and the electronic device.

5. The electronic device according to claim 4, further comprising an acceleration sensor, wherein the controller is configured to determines the distance based on an output signal from the acceleration sensor.

6. The electronic device according to claim 4, further comprising a distance measuring sensor, wherein the controller is configured to acquire the distance based on an output signal from the distance measuring sensor.

7. The electronic device according to claim 1, wherein the controller is configured to determine the state in which the user uses the electronic device based on a user operation.

8. The electronic device according to claim 1, wherein when the illuminance of the ambient light of the device is equal to or more than a first threshold and a second threshold, the controller switches the gesture detection from the camera to the gesture detection from the proximity sensor, the gesture detection is based only on the value output from the proximity sensor.

9. The electronic device according to claim 1, wherein:
the timer is configured to measure a predetermined time period,
wherein when the gesture detection is based only on the value output from the camera, the controller switches the gesture detection from the camera to the proximity sensor after the predetermined time period.

10. A program for causing an electronic device that includes a proximity sensor, a camera, a controller configured to switch between gesture detection based on a value output from the proximity sensor and gesture detection based on a value output from the camera, in accordance with an illuminance of an ambient light of the electronic device, a display configured to display a setting screen to set a period of time based on the gesture detection by the controller, and a timer configured to measure the period of time and to output a signal when the period of time has elapsed, wherein
the controller is further configured to adjust the period of time based on the gesture detection;
when the illuminance of the ambient light of the electronic device at a predetermined moment is less than a first threshold, the gesture detection is based only on the value output from the proximity sensor; and
when the illuminance of the ambient light of the electronic device at the predetermined moment is equal to or more than a first threshold, the controller switches the gesture detection from the proximity sensor to the gesture detection from the camera, the gesture detection is based only on the value output from the camera.

11. A control method of an electronic device that includes a proximity sensor, a camera, a controller for switching between gesture detection based on a value output from the proximity sensor and gesture detection based on a value output from the camera, in accordance with an illuminance of an ambient light of the electronic device, a display configured to display a setting screen to set a period of time based on the gesture detection by the controller, and a timer configured to measure the period of time and to output a signal when the period of time has elapsed, wherein
the controller is further configured to adjust the period of time based on the gesture detection;
when the illuminance of the ambient light of the electronic device at a predetermined moment is less than a first threshold, the gesture detection is based only on the value output from the proximity sensor; and
when the illuminance of the ambient light of the electronic device at the predetermined moment is equal to or more than a first threshold, the controller switches the gesture detection from the proximity sensor to the gesture detection from the camera, the gesture detection is based only on the value output from the camera.

* * * * *